United States Patent

Kawamura et al.

[11] Patent Number: 5,371,633
[45] Date of Patent: Dec. 6, 1994

[54] MECHANISM FOR DETECTING A ROTATION AMOUNT OF A DIAPHRAGM FOR USE IN OPTICAL SYSTEMS

[75] Inventors: Hiroshi Kawamura, Tokyo; Masato Tsujinaka, Kanagawa, both of Japan

[73] Assignee: Sony Corporation, Japan

[21] Appl. No.: 770,878

[22] Filed: Oct. 4, 1991

[30] Foreign Application Priority Data

Oct. 16, 1990 [JP] Japan .................. 2-276849

[51] Int. Cl.[5] .............. G02B 9/08; G02B 15/14; G02B 9/02
[52] U.S. Cl. .................. 359/739; 359/694; 359/697; 318/254; 354/271.1
[58] Field of Search ............. 359/227, 230, 233, 739, 359/740, 814, 819, 824, 696-706, 811-830, 789, 740, 823; 354/195.1-195.13, 400, 270-273; 318/138, 254, 459; 310/811, 26, 27, 68 B, DIG. 3

[56] References Cited

U.S. PATENT DOCUMENTS

| | | | |
|---|---|---|---|
| 4,086,519 | 4/1978 | Persson | 318/254 |
| 4,740,064 | 4/1988 | Kao et al. | 359/697 |
| 4,860,040 | 8/1989 | Tamamura et al. | 354/195.1 |
| 4,874,233 | 10/1989 | Yamamoto et al. | 359/823 |
| 4,922,274 | 5/1990 | Yamamoto et al. | 354/271.1 |

FOREIGN PATENT DOCUMENTS

| | | | |
|---|---|---|---|
| 0114404 | 8/1984 | European Pat. Off. | |
| 122506 | 7/1983 | Japan | 359/824 |
| 256870 | 11/1986 | Japan | 359/739 |
| 7014 | 1/1987 | Japan | 359/739 |
| 256914 | 10/1988 | Japan | 359/819 |
| 1345158 | 10/1987 | Russian Federation | 359/739 |

OTHER PUBLICATIONS

Patent Abstracts of Japan, vol. 6, No. 34, Mar. 2, 1982.
Patent Abstracts of Japan, vol. 6, No. 125 Jul. 10, 1982.

*Primary Examiner*—Scott J. Sugarman
*Assistant Examiner*—Thong Nguyen
*Attorney, Agent, or Firm*—Ronald P. Kananen

[57] ABSTRACT

A magnetic element is provided on the outer periphery of a ring member which is operatively connected with diaphragm blades. This magnetic element is either shaped or constructed so that it exhibits a magnetic gradient (viz., produces non-uniform magnetic leakage flux properties). A Hall sensor is mounted stationarily with respect to the ring member so as to respond to the change in magnetic leakage flux and indicate the amount of rotation of the ring.

13 Claims, 3 Drawing Sheets

5,371,633

MECHANISM FOR DETECTING A ROTATION AMOUNT OF A DIAPHRAGM FOR USE IN OPTICAL SYSTEMS

BACKGROUND OF THE INVENTION

1. Field of the Invention

This invention relates to a mechanism for detecting a rotation amount of a diaphragm for use in an optical system such as a camera.

2. Description of the Background Art

A camera such as a still camera, a video camera and the like has a driving actuator which rotatably operates diaphragm blades through a rotating ring. Conventionally, the actuator is also used for detecting a rotation amount of the diaphragm blades of the camera. FIG. 5 depicts a conventional driving actuator which serves for detection of operation of the diaphragm blades. Referring to FIG. 5, a driving actuator 50 includes a rotor 51 and a stator 53. The rotor 51 consists of semi-circular north- and south-polar magnet halves 51a and 51b which are attached together symmetrically around an axis 52 so as to form a rotor of circular shape. The stator 53 is provided, on an inner surface thereof, with a Hall element 54. The Hall element 54 faces a boundary defined between the magnets 51a and 51b and detects change in leakage flux generated from the rotor 51, which is rotatingly driven by energization of a coil 55 disposed on the stator 53.

When the rotor 51 rotates, the leakage flux traversing the Hall element 54 is altered. The amount of rotation of the diaphragm blades is ascertained by detecting change in an amount of the leakage flux which traverses the Hall element.

However, the driving actuator 50 has a small diameter so that only a small peripheral surface area of the rotor 51 moves relative to the element 54. Accordingly, the accuracy of leakage flux detection is lowered. In case that an opening defined by the diaphragm blades has a small diameter, it is difficult to precisely determine the amount diaphragm blade rotation since the detection can be made only within a limited range.

SUMMARY OF THE INVENTION

It is an object of the present invention to provide a mechanism for detecting a rotation amount of a diaphragm for use in optical systems, which is operable over a wide range and with high accuracy.

In order to accomplish this object, there is provided a mechanism for detecting a rotation amount of a diaphragm for use in an optical system including an actuator mounted on a cover plate which is secured on the rear side of a base plate in the optical system, and provided with a rotating axis projecting from a front end surface of the actuator to which an arm member is pivotably supported. The cover plate has a circular opening formed at the center thereof and an annular projection extending from a periphery of the opening toward the front side of the optical system. The optical system also includes diaphragm means which are pivotably supported around pins on the rear side of the base plate and have guide holes thereon. Rotating ring means is also provided, which has a notch on an outer periphery thereof, into which an end of the arm member of the actuator is engaged. On the rear side surface of the rotating ring means are provided pins which are engaged into the guide holes of the diaphragm means, and an annular projection which extends toward the rear side of the optical system so as to be engaged with the annular projection of the cover plate. The mechanism for use in the optical system includes a magnet which has a magnetic gradient and is fixed on the outer periphery of the rotating ring means. The mechanism further includes means for detecting magnetic leakage flux which is secured in the cover plate so as to be disposed opposite the magnet and spaced at a given clearance apart therefrom.

DETAILED DESCRIPTION OF THE PREFERRED EMBODIMENT

The preferred embodiment of a mechanism for detecting a rotation amount of a diaphragm, for use in an optical system, according to the present invention will now be described with reference to the accompanying drawings.

Figure 1:
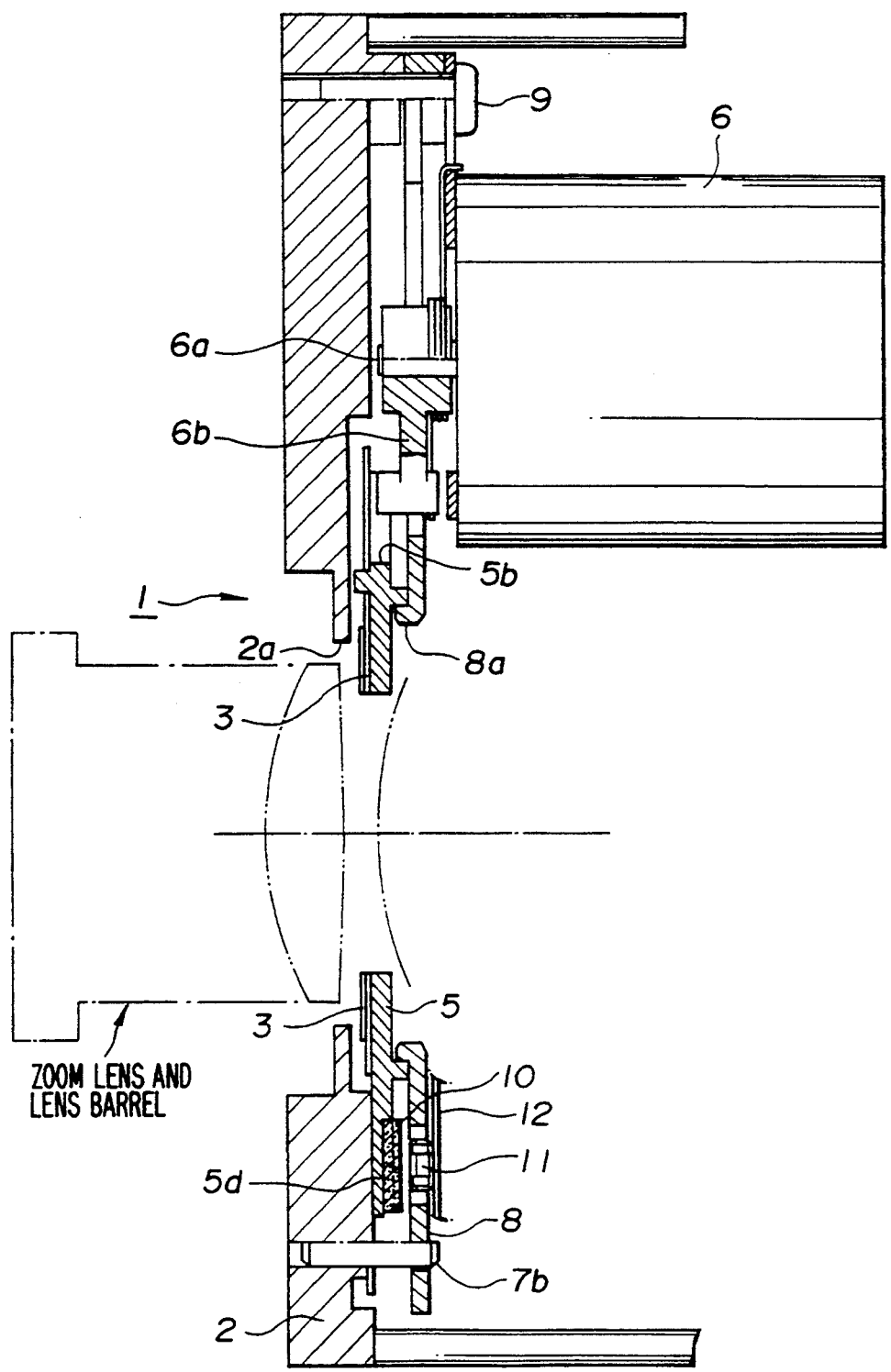
FIG. 1 is a sectional view illustrating a diaphragm-operating mechanism in which a mechanism for detecting a rotation amount of a diaphragm according to one embodiment of the present invention is incorporated.
Figure 2:
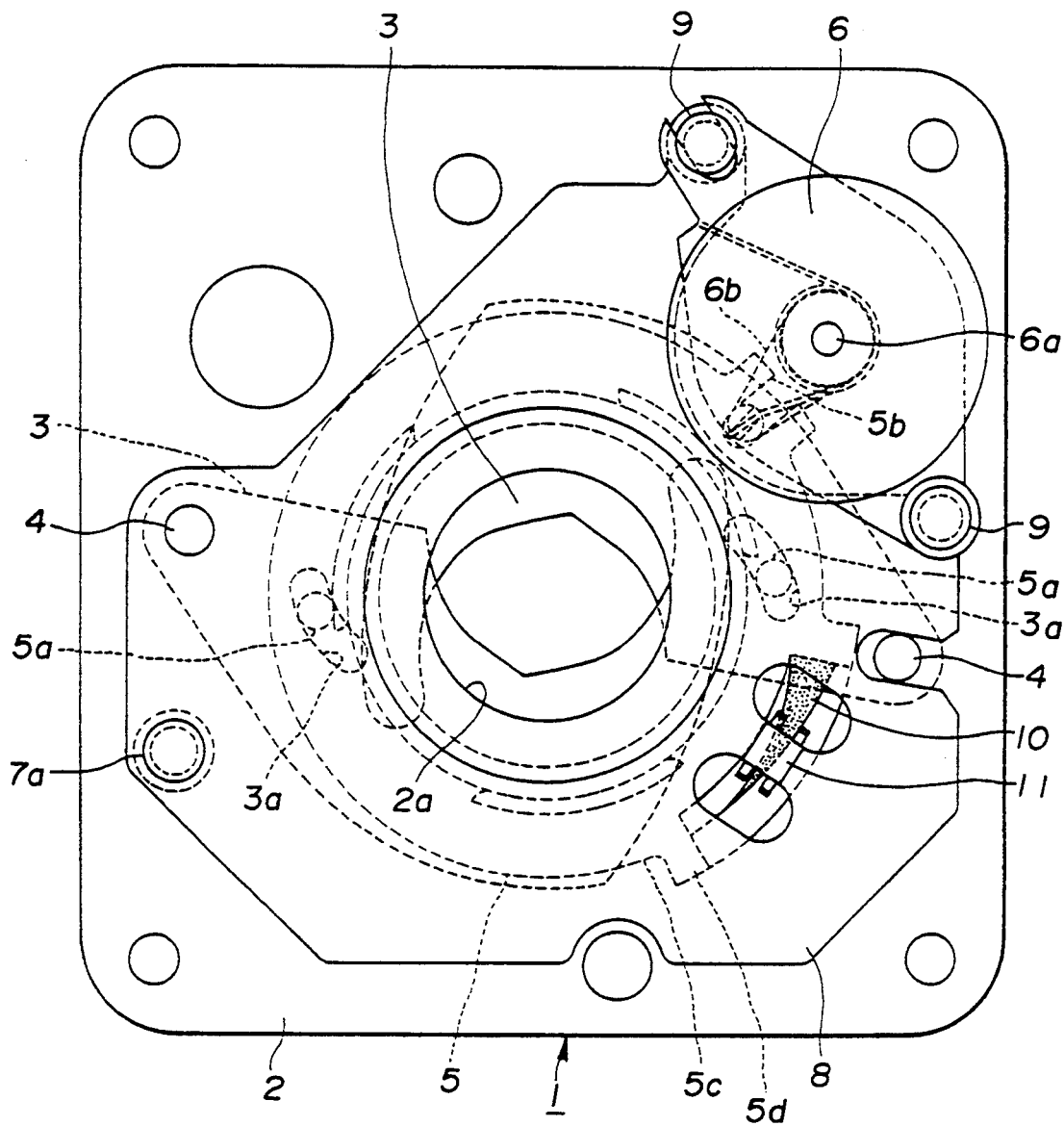
FIG. 2 is a rear view of the diaphragm-operating mechanism of FIG. 1.

FIGS. 1 and 2 depict a diaphragm-operating mechanism for use in a camera such as a video camera. Referring to FIGS. 1 and 2, the diaphragm-operating mechanism 1 includes a square base plate 2 having a center opening 2a receiving a lens. On a rear side surface of the base plate 2, a pair of diaphragm blades 3, 3 are pivotably mounted around pins 4, 4 such that the opening 2a is closed or opened by rotating the diaphragm blades 3, 3. Each diaphragm blade 3 is provided with an arcuate guide hole 3a into which a pin 5a, which projects from a front side face of the rotating ring 5, is engaged. The rotating ring 5 has a notch 5b on an outer periphery 5c thereof. An end portion of an arm member 6b, which is rotatably mounted on a rotating shaft 6a of an actuator 6, is engaged in notch 5b. The actuator 6 is secured by screws 9, 9 to a cover plate 8 which is in turn fixedly secured to a rear side face of the base plate 2 by means of fastening members such as a screw 7a and a pin 7b. The cover plate 8 has a center opening 8a aligned with the opening 2a of the base plate 2. Formed along an inner front-side periphery of the cover plate 8 is an annular projection which engages a corresponding projection formed on the rear side of the rotating ring. This rotatably supports the rotating ring 5 on the cover plate 8 with this arrangement, when the actuator 6 is energized, the arm member 6b mounted on the rotating axis 6a forces the rotating ring 5 to rotate in a direction reverse to the rotational direction of the actuator 6, along the annular projection of the cover plate 8. The rotation of the rotating ring 5 causes the pins 5a, 5a to be moved along the guide holes 3a, 3a so that the diaphragm blades 3, 3 are urged to be pivotally moved around the pins 4, 4 so as to open or close the opening 2a of the base plate 2.

As shown in FIG. 1, the rotating ring 5 is provided, on the outer periphery 5c, with an arcuate protrudent portion 5d on a rear side surface of which an arcuate recess is formed. A magnetic plate 10, which has a uniform thickness, is attached within the arcuate recess by way of adhesive or the like. The magnetic plate 10 has one polarity portion, e.g. the north polarity portion, and is tapered in width in a circumferential direction of the rotating ring 5. Accordingly, the magnetic plate 10 has an approximately triangular shape, and exhibits a magnetic force which gradually alters due to the tapered configuration. A Hall element 11 is secured to the cover plate 8 by press fitting or the like. This element is disposed opposite and spaced at a given clearance from the magnetic plate 10. In FIG. 1, numeral 12 denotes a flexible substrate attached to the element 11.

The mechanism for detecting the rotation of a diaphragm according to the preferred embodiment of the present invention, includes the magnetic plate 10 with gradually changed magnetic force which is attached to the rotating ring 5 for rotating the diaphragm blades 3, 3. When the rotating ring 5 is rotated by the actuator 6, the magnetic plate 10 passes over the Hall element 11. The Hall element 11 detects change in magnetic leakage flux generated by the plate 10. On the basis of the detected flux change the amount of rotation of the diaphragm blade 3 is determined. Since the magnetic plate 10 is arranged at the arcuate protrudent portion 5d extending radially outwardly from the outer periphery 5c, the amount of movement of the magnetic plate 10 in the circumferential direction of the rotating ring 5, is relatively large. The mechanism according to the invention therefore can precisely detect the rotation amount of the diaphragm blade 3. Even in a case where the diaphragm blades have a relative small diameter, the degree of rotation may be accurately determined.

Figure 3:
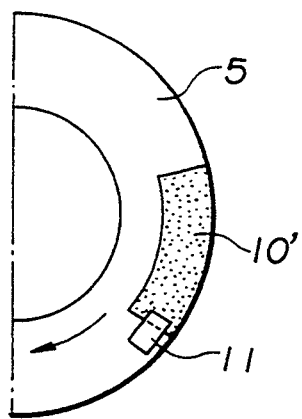
FIG. 3 is a schematic rear view of a mechanism for detecting a rotation amount of a diaphragm according to another embodiment of the present invention.
Figure 4:
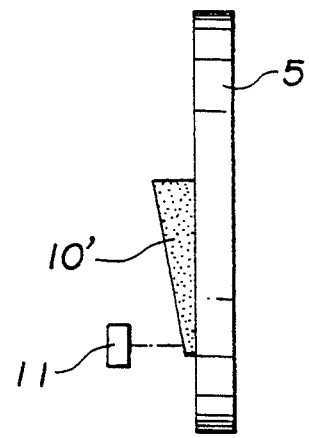
FIG. 4 is a schematic side view of the mechanism of FIG. 3.
Figure 5:
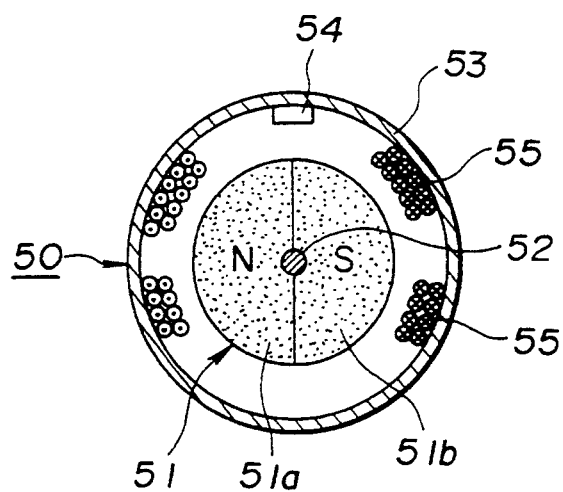
FIG. 5 is a schematic sectional view of a conventional driving actuator for a rotating ring for use in a camera.

Another embodiment of the present invention is shown in FIGS. 3 and 4. In these figures, like parts and elements are designated by like numerals and a detailed description of the same is omitted for brevity.

As shown in FIG. 3, a magnetic plate 10', which has an arcuate shape and uniform radial width, is attached to an outer periphery of the rear side of a rotating ring 5 so as to extend circumferentially and be disposed opposite a Hall element. Moreover, the magnetic plate 10' is tapered and therefore has a triangular axial cross section (see FIG. 4). Thus, the magnet plate 10' has a magnetic gradient along which a magnetic force of the magnetic plate 10' is reduced in a radially outward direction. The second embodiment provides the same function and effect as the first embodiment.

As is obvious from the aforementioned description of the preferred embodiments according to the invention, a mechanism for detecting a rotation amount of a diaphragm for use in an optical system includes a magnet which exhibits magnetic force gradient and a means for detecting magnetic leakage flux generated by the magnet. The magnet is fixed on an outer peripheral side of a rotating ring which rotates the diaphragm means of the optical system. Means for detecting magnetic flux is disposed opposite the magnet so as to be spaced at a given clearance therefrom. With this arrangement the amount of movement of the magnet in a rotational direction is larger as compared with the conventional actuator in which both magnet and detecting means are incorporated. Accordingly, the amount of rotational movement of the diaphragm means may be detected with high accuracy and over a wide range.

As described in the first and second embodiments mentioned above, the magnetic gradient is produced by changing the width or thickness of the magnetic plate. However, the magnet plate may otherwise be arranged to exhibit magnetic force gradient by using a variable (viz., non-uniform) magnetic flux density. For example, it is within the scope of the instant invention to use a magnetic plate which has a uniform thickness and width and which is constituted in such a way that the necessary magnetic gradient characteristics are produced.

In addition, it will be noted that the detecting mechanism according to the invention is further applicable for detecting an amount of rotational movement of a lens barrel containing a zoom lens or the like.

What is claimed is:

1. A mechanism for detecting a rotation amount of a diaphragm for use in an optical system, comprising:
    a cover plate which is secured to a base plate, said cover plate having a circular opening formed at the center thereof and a first annular projection which projects from a periphery of the opening;
    an actuator mounted on said cover plate, said actuator having a shaft on which an arm member is rotatably supported;
    diaphragm means pivotably supported on a rear side of the base plate, said diaphragm means having guide holes therein;
    rotatable ring means, said ring means being operatively connected with said arm member and having pins which engage the guide holes of said diaphragm means, said ring means having a second annular projection which engages with said first annular projection of the cover plate;
    a magnet fixed on an outer periphery of said ring means, said magnet being arranged so that it exhibits a magnetic gradient in an peripheral direction of said ring means; and
    detecting means responsive to the magnetic gradient disposed on said cover plate so as to be disposed opposite said magnet.

2. The mechanism according to claim 1, wherein said detecting means is a Hall element.

3. The mechanism according to claim 1 wherein said magnet has a uniform thickness and is tapered in a circumferential direction of said rotating ring means.

4. The mechanism according to claim 1, wherein said magnet is of arcuate shape, has a uniform radial width and is tapered in thickness outwardly.

5. The mechanism according to claim 1, wherein said magnet has a magnetic flux density varying along a circumferential direction of said rotating ring means while having a uniform thickness and width.

6. The mechanism according to claim 1, wherein said diaphragm means is a diaphragm blade.

7. The mechanism according to claim 1, wherein said rotating ring means is mounted on a lens barrel containing a zoom lens.

8. A mechanism for detecting an amount of rotation of a selectively rotatable ring member, comprising:
    magnet means disposed on said ring member, said magnet means comprising a single continuous body having a length, and a width and which is tapered along its width so as to have an essentially wedge-shaped configuration, for producing a magnetic force which gradually alters in a circumferential direction of said rotatable ring member and thus establishes a magnetic gradient along said single continuous body; and sensor means responsive to the change in magnetic force produced by said magnet means, for determining the amount of rotation of said ring member.

9. A mechanism for detecting a rotation amount of a diaphragm for use in an optical system, comprising:
- a cover plate which is secured to a base plate, said cover plate having a circular opening formed at the center thereof and a first annular projection which projects from a periphery of the opening;
- an actuator mounted on said cover plate, said actuator having a shaft on which an arm member is rotatably supported;
- diaphragm means pivotably supported on a rear side of the base plate, said diaphragm means having guide holes therein;
- rotatable ring means, said ring means being operatively connected with said arm member and having pins which engage the guide holes of said diaphragm means, said ring means having a second annular projection which engages with said first annular projection of the cover plate;
- a magnet fixed on an outer periphery of said ring means, said magnet having a uniform thickness and being tapered in a circumferential direction of said ring means; and
- means for detecting magnetic leakage flux disposed on said cover plate so as to be disposed opposite said magnet.

10. A mechanism for detecting a rotation amount of a diaphragm for use in an optical system, comprising:
- a cover plate which is secured to a base plate, said cover plate having a circular opening formed at the center thereof and a first annular projection which projects from a periphery of the opening;
- an actuator mounted on said cover plate, said actuator having a shaft on which an arm member is rotatably supported;
- diaphragm means pivotably supported on a rear side of the base plate, said diaphragm means having guide holes therein;
- rotatable ring means, said ring means being operatively connected with said arm member and having pins which engage the guide holes of said diaphragm means, said ring means having a second annular projection which engages with said first annular projection of the cover plate;
- a magnet fixed on an outer periphery of said ring means, said magnet being wedge shaped and having a uniform radial width; and
- means for detecting magnetic leakage flux disposed on said cover plate so as to be disposed opposite said magnet.

11. A mechanism for detecting a rotation amount of a diaphragm for use in an optical system, comprising:
- a cover plate which is secured to a base plate, said cover plate having a circular opening formed at the center thereof and a first annular projection which projects from a periphery of the opening;
- an actuator mounted on said cover plate, said actuator having a shaft on which an arm member is rotatably supported;
- diaphragm means pivotably supported on a rear side of the base plate, said diaphragm means having guide holes therein;
- rotatable ring means, said ring means being operatively connected with said arm member and having pins which engage the guide holes of said diaphragm means, said ring means having a second annular projection which engages with said first annular projection of the cover plate;
- a magnet fixed on an outer periphery of said ring means, said magnet having a uniform thickness and width, but being so constituted as to exhibit a magnetic flux density which varies in the circumferential direction; and
- means for detecting magnetic leakage flux disposed on said cover plate so as to be disposed opposite said magnet.

12. A mechanism for detecting a rotation amount of a diaphragm for use in an optical system, comprising:
- a cover plate which is secured to a base plate, said cover plate having a circular opening formed at the center thereof and a first annular projection which projects from a periphery of the opening;
- an actuator mounted on said cover plate, said actuator having a shaft on which an arm member is rotatably supported;
- a plurality of diaphragm blades pivotably supported on the base plate, said diaphragm blades each having a guide hole formed therein;
- rotatable ring means, said ring means being operatively connected with said arm member and having pins which engage the guide holes in said diaphragm blades, said ring means having a second annular projection which engages said first annular projection of the cover plate;
- a magnet fixed on an outer periphery of said ring means, said magnet being arranged so that it exhibits a magnetic gradient in the peripheral direction of said ring means; and
- means for detecting magnetic leakage flux disposed on said cover plate so as to be disposed opposite said magnet.

13. A mechanism for detecting an amount of rotation of a selectively rotatable ring member, comprising:
- magnet means disposed on said ring member, said magnet means comprising a single continuous body having an essentially wedge-shaped tapered configuration for producing a magnetic force which gradually alters in a circumferential direction of said rotatable ring member and thus establishes a magnetic gradient which extends along said body, said magnet means being disposed on an essentially flat non-curved radially extending surface of said ring member; and
- sensor means responsive to the change in magnetic force produced by said magnet means, for determining the amount of rotation of said ring member, said sensor means being arranged to face the essentially flat radially extending surface of said ring member on which said magnet means is disposed.

* * * * *